United States Patent [19]

Berg et al.

[11] 4,099,632
[45] Jul. 11, 1978

[54] ARRANGEMENT FOR WITHDRAWING MATERIAL FROM A SILO

[75] Inventors: Stig Ove Berg, Huskvarna; Rolf Tore Persson, Forshaga, both of Sweden

[73] Assignee: C J Wennberg AB, Sweden

[21] Appl. No.: 704,839

[22] Filed: Jul. 13, 1976

[51] Int. Cl.² .................. A01F 25/00; B65G 65/30
[52] U.S. Cl. .......................... 214/17 DA; 222/404
[58] Field of Search .................. 214/17 DA; 222/404

[56] References Cited

U.S. PATENT DOCUMENTS

| | | | |
|---|---|---|---|
| 3,498,479 | 3/1970 | Weaver et al. | 214/17 DA |
| 3,820,672 | 6/1974 | Gustafsson | 214/17 DA |
| 3,908,839 | 9/1975 | Menaut | 214/17 DA |

Primary Examiner—Drayton E. Hoffman
Assistant Examiner—Lawrence E. Williams

Attorney, Agent, or Firm—Craig & Antonelli

[57] ABSTRACT

Arrangement for withdrawing material from the bottom portion of a silo having an inclined silo bottom and a discharge funnel at the lowest point of the silo bottom, comprising a conveying screw which is disposed above the inclined silo bottom and which on the one hand is rotatable about its longitudinal axis and on the other hand moves along the silo bottom and which conveys the material in the direction towards a discharge funnel at the lowest point of the silo bottom, and wherein the drive of the screw is disposed outside the silo wall and the bearing of the screw is disposed at the opposite end outside the discharge funnel and on the latter, both the drive and the discharge funnel being rotatably mounted to permit a sweeping movement of the screw over the silo bottom.

5 Claims, 1 Drawing Figure

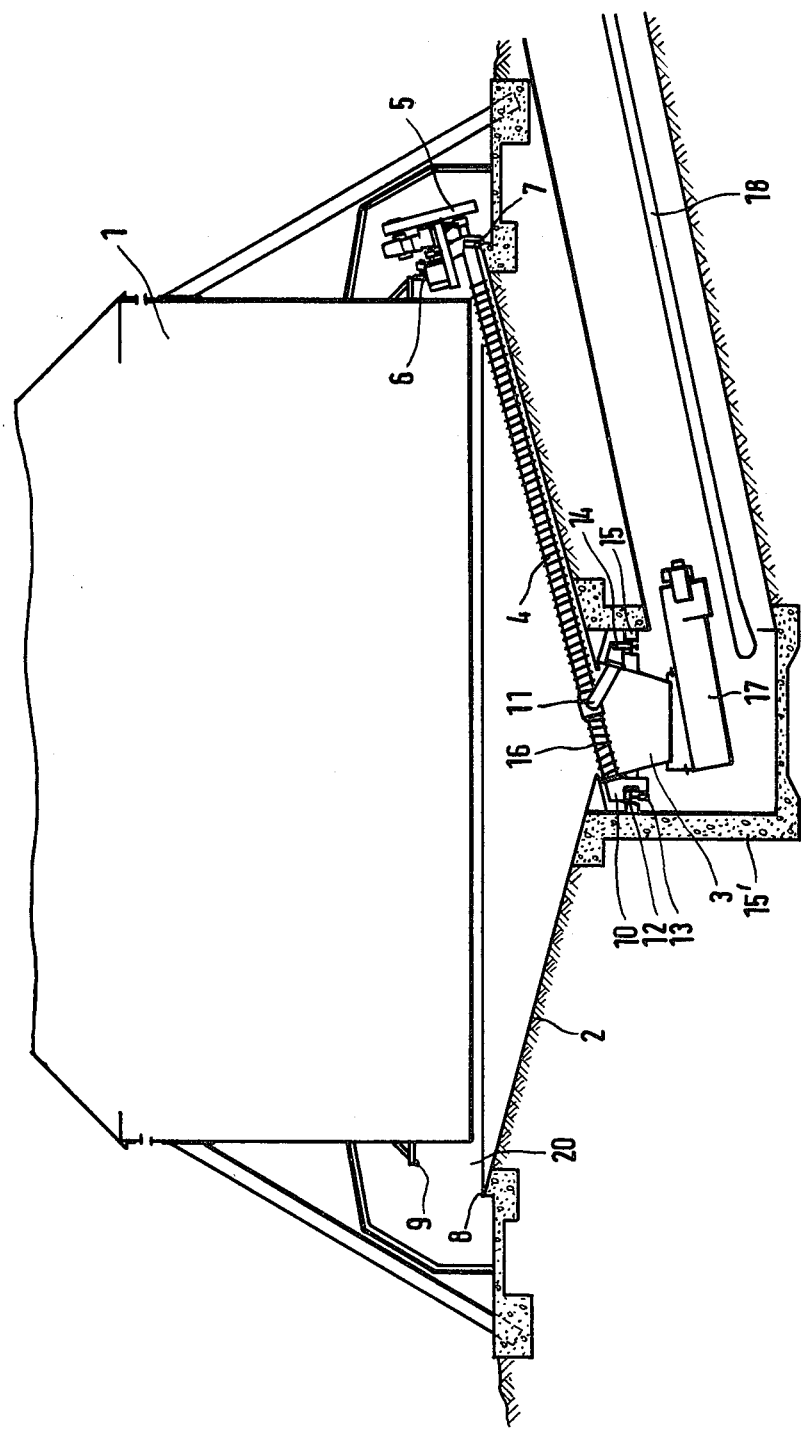

ARRANGEMENT FOR WITHDRAWING MATERIAL FROM A SILO

For discharging material from silos a large number of arrangements are known which have very different forms with regard to various factors and in particular with regard to the form of the material, its consistency, homogeneity etc. As a rule moveable elements were arranged at the bottom of the silo, such as cutting tools, for example chain cutters and/or rotating blades, screws rotated about their longitudinal axis and in some cases also screws with an oscillating motion above the bottom of the silo.

Hitherto, the problem in mounting screws resided in arranging their drive so that it does not interfere with the withdrawal or discharge operation. At the same time, provisions had to be made to counteract sagging, for example in the case of long screws in combination with heavy material. Swedish Pat. No. 324,997 describes such an apparatus for the discharge, in particular for the withdrawal of wood chips, pulverulent material and the like, where the drive assembly is arranged both outside the actual discharge space and also permits an oscillating movement of the screw over the funnel-like silo bottom. This arrangement gives satisfactory results in the case of silos having a relatively small bottom diameter of for example less than 8 meters. On the other hand, difficulties arise as soon as diameters over 8 meters are involved. This is because a force moment as necessary to discharge bottom areas having a diameter greater than 8 meters cannot be produced with arrangements corresponding to the construction form of Swedish Pat. No. 324,997.

The present invention thus relates to the further development of the arrangement described in the aforementioned patent and is characterized mainly in that the drive for the screw is arranged outside the silo wall and the bearing for the screw lies on the opposite side outside the discharge funnel. The arrangement of the drive according to the invention permits the use of a larger force moment, enabling relatively large silos to be operated. Another substantial advantage of this arrangement is that the material is pushed into the discharge funnel and that archings are eliminated by the reciprocating oscillating and/or rotary movement of the screw, which by a suitable arrangement sweeps over the funnel-like bottom of the silo without either the drive of the screw or its end bearing coming into contact with the material.

The fact that the discharge screw is provided in its lower portion, at the bearing, with a thread of reverse pitch avoids accummulation of material at this point and ensures mobility.

To describe the idea underlying the invention more exactly in the attached drawing an example of embodiment is shown of the constructional form of the arrangement according to the invention. The FIGURE shows a section through a silo having a discharge arrangement according to the present invention.

1 designates the silo which is cylindrical in the example shown. The bottom 2 of the silo is funnel-shaped with a relatively small angle of inclination. The withdrawal of the material in the silo 1 is central through a funnel 3 with the aid of a withdrawal screw 4 which extends through a slot 20 between the silo 1 and the silo bottom 2 to a drive assembly 5 which is disposed outside the silo wall and is mounted with rollers 6, 7 on the bearing tracks 8, 9 which lie round the silo at the outside thereof. At the opposite end the screw 4 is mounted in a support bearing 10 which is disposed at the outside of the funnel 3 and carried by the latter. In the embodiment shown an intermediate bearing 11 is provided which is also carried by the funnel 3. The bearings 10, 11 and the funnel 3 are rotatable by means of rollers 12, 13, 14 and move on a bearing track 15 which is disposed round the funnel 3 on a fixed bottom member 15' of the silo.

As apparent from the above description in spite of its satisfactory mounting permitting large force moments to be taken up the screw 4 can execute an oscillating and/or rotary motion over the silo bottom and in the example shown this motion may make up a complete revolution. Beneath the funnel 3 means 17, 18 are provided for the further transport of the material.

The withdrawal screw 4 is advantageously provided at its lower portion, which is disposed above and/or in the funnel 3, with a thread 16 which has a pitch opposite to that of the screw thread of the remaining screw 4. In this manner an accummulation of material at this point is avoided.

The embodiment shown can of course be modified without leaving the idea underlying the invention. The motion of the screw 4 need not cover a complete revolution but may be restricted to a sector of the silo bottom if the remaining shape of the silo permits. The drive 5 used for the screw may be of any desired type and may have a form different to that shown in the example, this also applying to the bearings 11, 12.

Preferably, the screw 4 is disposed in the immediate vicinity of the silo bottom to ensure that the material on the silo bottom 2 is conveyed by the movement of the screw 4 along the silo bottom 2 in the direction towards the funnel 3 and that substantially no material fixedly settles on the silo bottom 2 at least in the region thereof over which the screw 4 sweeps. The mounting and bending strength of the screw 4 are preferably so chosen that the screw 4 does not touch the silo bottom 2. The silo according to the invention preferably has a diameter greater than 10 m and serves for example to store wood chips for the production of chipboard or the manufacture of cellulose or for storing tree bark or similar waste.

The drive assembly 5 may include as drive an electric motor which with the reciprocal oscillating motion of the conveying screw 4 may be supplied with current via a loose cable. With a rotating screw 4 the current for the drive motor of the assembly 5 may be supplied via slip rings. Preferably, the space within which the drive assembly 5 moves along the bearing tracks 8, 9 may be sealed from the outside by means of a cover 22. This cover 22 may serve simultaneously as support for the silo container 1 and additional supports 23 may be provided for supporting the silo container. The transport means 17 may be a conveying belt or a conveying screw and the transport means 18 is preferably a conveying belt.

In the drawings and specification, there has been set forth a preferred embodiment of the invention, and although specific terms are employed, they are used in a generic and descriptive sense only and not for purposes of limitation.

What we claim is:

1. An arrangement for withdrawing material from a funnel-shaped bottom portion of a silo comprising a discharge funnel rotatably mounted at the lowest point of the funnel shaped silo bottom and a conveying screw inclined according to the inclination of the funnel-shaped bottom portion of the silo and extending radially outwardly from the discharge funnel through a slot in a wall of the silo, which conveying screw is rotatable about its longitudinal axis by means of a drive arrangement outside the silo wall and a radially outwardly lying end portion of the conveying screw together with the drive being mounted on a first bearing track means extending outside the silo wall in the circumferential direction of the silo and a radially inwardly lying end portion of the conveying screw extending beyond a side of the discharge funnel, being mounted on a second bearing track means extending outside the discharge funnel and below the silo bottom in the circumferential direction of the discharge funnel, and the conveying screw together with the drive being movable in the circumferential direction of the funnel-shaped bottom portion of the silo to produce a sweeping movement over the silo bottom.

2. Arrangement according to claim 1 characterized in that the portion of the screw which is disposed above the funnel is provided with a thread whose pitch is directed opposite to the pitch of the screw thread on a remaining portion of said screw.

3. Arrangement according to claim 1, characterized in that the screw is mounted in an intermediate bearing which is carried by the funnel on the side diametrically opposite said second bearing track means.

4. A device according to claim 1, wherein the end of the screw opposite said radially outwardly extending end extends beyond said funnel and below said silo portion, and second bearing means mounting said opposite end of said screw for circumferential rotation with respect to said silo portion.

5. A device according to claim 4, wherein said bearing means comprises track means extending circumferentially outside said silo and said second bearing means comprises second track means extending circumferentially outside said discharge funnel.

* * * * *